United States Patent
Koishikawa

(10) Patent No.: US 9,902,214 B2
(45) Date of Patent: Feb. 27, 2018

(54) PNEUMATIC TIRE

(71) Applicant: The Yokohama Rubber Co., Ltd., Minato-ku, Tokyo (JP)

(72) Inventor: Yoshifumi Koishikawa, Kanagawa (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 529 days.

(21) Appl. No.: 14/560,655

(22) Filed: Dec. 4, 2014

(65) Prior Publication Data

US 2015/0083298 A1   Mar. 26, 2015

Related U.S. Application Data

(63) Continuation of application No. 13/737,574, filed on Jan. 9, 2013, now Pat. No. 9,004,129.

(30) Foreign Application Priority Data

Jan. 10, 2012  (JP) .................................. 2012-001977
Jan. 10, 2012  (JP) .................................. 2012-001992

(51) Int. Cl.
   *B60C 5/14*   (2006.01)
   *B60C 19/00*   (2006.01)

(52) U.S. Cl.
   CPC ............... *B60C 19/00* (2013.01); *B60C 5/14* (2013.01); *B60C 2005/145* (2013.01); *B60C 2005/147* (2013.01); *Y10T 152/10495* (2015.01)

(58) Field of Classification Search
   CPC .............. B60C 5/00; B60C 5/14; B60C 5/142
   See application file for complete search history.

(56) References Cited

U.S. PATENT DOCUMENTS 7,537,035 B2   5/2009   Matsuda et al.

FOREIGN PATENT DOCUMENTS

| EP | 2172349 B1 | | 4/2010 |
|----|------------|---|--------|
| JP | 63-158235 | * | 7/1988 |
| JP | H06-055661 A | | 3/1994 |
| JP | 09058207 | * | 3/1997 |
| JP | 2008-149609 | * | 7/2008 |
| JP | 2009-241855 A | | 10/2009 |

* cited by examiner

*Primary Examiner* — Justin R Fischer
(74) *Attorney, Agent, or Firm* — Global IP Counselors, LLP

(57) ABSTRACT

A pneumatic tire in which an inner liner including a film mainly made of thermoplastic resin is attached to an inside of the tire via a tie rubber sheet, on an inner side of a carcass layer, and which has a lap-splice portion where end portions of the film in a tire circumferential direction overlap each other in a tire widthwise direction with tie rubber therebetween. A section of the film on a tire cavity side in the lap-splice portion has a portion where the film is thin over part or entirety of the width in the tire widthwise direction before the lap-splice portion, or a film thickness in the lap-splice portion is smaller than a film thickness in a portion other than the lap-splice portion. Thus, the pneumatic tire has no crack developing around the lap-splice portion of an inner liner layer after running, and has excellent durability.

6 Claims, 8 Drawing Sheets

(a)

(b)

(a)

(b)

(a)

(b)

(c)

PNEUMATIC TIRE

CROSS-REFERENCE TO RELATED APPLICATIONS

This is a continuation application of U.S. patent application Ser. No. 13/737,574, filed on Jan. 9, 2013, which claims priority under 35 U.S.C. § 119(a) to Japanese Patent Application No. 2012-001977, filed in Japan on Jan. 10, 2012 and Japanese Patent Application No. 2012-001992, filed in Japan on Jan. 10, 2012, the entire contents of U.S. patent application Ser. No. 13/737,574 and Japanese Patent Application Nos. 2012-001977 and 2012-001992 are hereby incorporated herein by reference.

BACKGROUND

Field of the Invention

The present invention relates to a pneumatic tire. More specifically, the present invention relates to a pneumatic tire having an inner liner that is configured to improve durability of the pneumatic tire.

Background Information

In recent years, it has been proposed to use a film mainly made of a thermoplastic resin as an inner liner for a pneumatic tire as described, for example, in Japanese patent application Kokai publication No. 2009-241855. For actual use of such a film, a manufacturing method is generally employed in which the laminated sheet including the film and a tie rubber sheet cured and adhered to the film are wound around a tire making drum and lap-spliced and are then subjected to a step of cure-molding the tire.

Alternatively, a tire can be manufactured by pulling out and cutting the laminated sheet, which includes the film mainly made of the thermoplastic resin and the tie rubber sheet and which has been wound into a roll-shaped body, from the roll-shaped body by a desired length, and winding the laminated sheet around the tire making drum. The process further includes lap-splicing the laminated sheet on the drum or the like, and then cure-molding the laminated sheet. In this case, after the tire starts to be used for running, delamination may occur between the film mainly made of the thermoplastic resin, which constitutes the inner liner, and the tie rubber sheet that has been cured and adhered to the film.

To further illustrate this, as shown in FIG. 5(a), a laminated sheet 1 including a film 2 mainly made of a thermoplastic resin and a tie rubber layer 3 is cut into a predetermined size (length) with an edge tool or the like. Then, both end portions of the laminated sheet 1 are overlapped with each other and lap-spliced on a tire making drum in such a way that a lap-splice portion S is provided and the laminated sheet 1 forms an annular shape. When one laminated sheet 1 is used, both end portions thereof are lap-spliced in such a way that laminated sheet 1 forms an annular shape. Meanwhile, when a plurality of laminated sheets 1 are used, corresponding end portions of the laminated sheets 1 are lap-spliced and joined together in such a way that the laminated sheets 1 form one annular shape as a whole.

Then, other parts (not illustrated) necessary for manufacturing the tire are wound and cure-molding is performed with a bladder. As a result of the cure-molding, the film 2 mainly made of the thermoplastic resin forms an inner liner layer 10 as shown in the view in FIG. 5(b) as a model. Around the lap-splice portion S, there are formed a portion where the film 2 mainly made of the thermoplastic resin is exposed and a portion where the film 2 is embedded in the tie rubber layer. That is, in FIGS. 5(a) and 5(b), an upper side is a tire inner cavity side. In other words, there is formed a pneumatic tire T which has the lap-splice portion S where the end portions of the film 2 in the tire circumferential direction overlap each other in the tire widthwise direction with the tie rubber therebetween and in which the lap-splice portion S exists extending in the tire widthwise direction.

The phenomenon of delamination between the aforementioned film 2 mainly made of the thermoplastic resin and the tie rubber sheet 3 cured and adhered to the film 2 occurs particularly in a vicinity 4 of the tip or the like of the film 2 at a spot shown in FIG. 5(b) where the film 2 mainly made of the thermoplastic resin is exposed. In the beginning, a crack develops, and then grows into the sheet delamination phenomenon.

SUMMARY

In view of the above-mentioned circumstance, an object of the present invention is to provide a pneumatic tire in which an inner liner including a film mainly made of a thermoplastic resin is attached to an inside of the tire via a tie rubber sheet, on an inner side of a carcass layer, and which has a lap-splice portion where end portions of the film in a tire circumferential direction overlap each other in a tire widthwise direction with tie rubber therebetween. Therefore, the pneumatic tire has no crack developing around a lap-splice portion of the inner liner layer after the pneumatic tire starts to be used for running, and thus has excellent durability.

In order to achieve the above object, the present invention provides a pneumatic tire according to disclosed embodiments. One embodiment provides a pneumatic tire in which an inner liner including a film mainly made of a thermoplastic resin is attached to an inside of the tire via a tie rubber sheet, on an inner side of a carcass layer, and which has a lap-splice portion where end portions of the film in a tire circumferential direction overlap each other in a tire widthwise direction with tie rubber therebetween. Also, in the pneumatic tire, a section of the film on a tire cavity side in the lap-splice portion has a portion where the film is thin over part or entirety of the width in the tire widthwise direction, before the lap-splice portion.

Also, in the pneumatic tire according to this embodiment, a circumferential-direction overlap length of the lap-splice portion is 3 to 30 mm, a tire-circumferential-direction length of the portion where the film is thin is 0.1 to 10 mm, and a thickness of the portion where the film is thin is 20% to 80% of a thickness T of the film. Also, the film is thin over part of the width in the tire widthwise direction, before the lap-splice portion, and the portion where the film is thin exists at least in a region between a belt end portion and a tip of a bead filler portion in a cross section along a tire meridian line.

Another embodiment provide a pneumatic tire in which an inner liner including a film mainly made of a thermoplastic resin is attached to an inside of the tire via a tie rubber sheet, on an inner side of a carcass layer, and which has a lap-splice portion where end portions of the film in a tire circumferential direction overlap each other in a tire widthwise direction with tie rubber therebetween. Also, at least one of a section of the film on a tire cavity side and a section of the film on a tire outer circumference side in the lap-splice portion is formed in such a way that a film thickness in the lap-splice portion is smaller than a film thickness in a portion other than the lap-splice portion.

Furthermore, in the pneumatic tire according to this embodiment, a portion of the lap-splice portion which is formed to be thinner than a film thickness of the portion other than the lap-splice portion is formed to have such a shape that the film becomes thinner stepwise, and a film thickness of the portion of the lap-splice portion where the film is thin is 20 to 80% of the thickness of the film in the portion other than the lap-splice portion. Also, an overlap length of the lap-splice portion in the circumferential direction is 3 to 30 mm. Furthermore, the portion of the lap-splice portion which is formed to be thinner than a film thickness of the portion other than the lap-splice portion exists at least in a region between a belt end portion and a tip of a bead filler portion in a cross section along a tire meridian line.

Accordingly, as will be described in more detail herein, after the pneumatic tires according to the disclosed embodiments start to be used for running a vehicle, no delamination occurs between the film mainly made of the thermoplastic resin which constitutes the inner liner and the tie rubber sheet cured and adhered to the film mainly made of the thermoplastic resin. The pneumatic tire therefore have excellent running durability.

DETAILED DESCRIPTION OF EMBODIMENTS

Embodiments of the present invention will now be explained with reference to the drawings. Description is given of materials of an inner liner which is a matter common to all of the embodiments.

Figure 1:
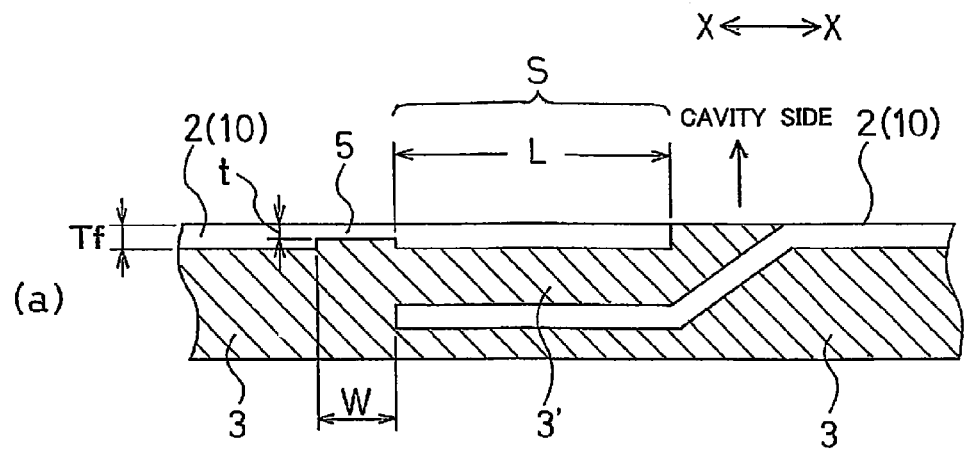
FIGS. 1(a) and 1(b) illustrate a portion of a pneumatic tire according to a disclosed embodiment in which a section of a film on a tire cavity side in a lap-splice portion has a portion where the film is thin over part or entirety of the width in the tire widthwise direction, before the lap-splice portion, with FIG. 1(a) being a side cross-sectional view around the lap-splice portion, and FIG. 1(b) being a plan view of the lap-splice portion.
Figure 1:
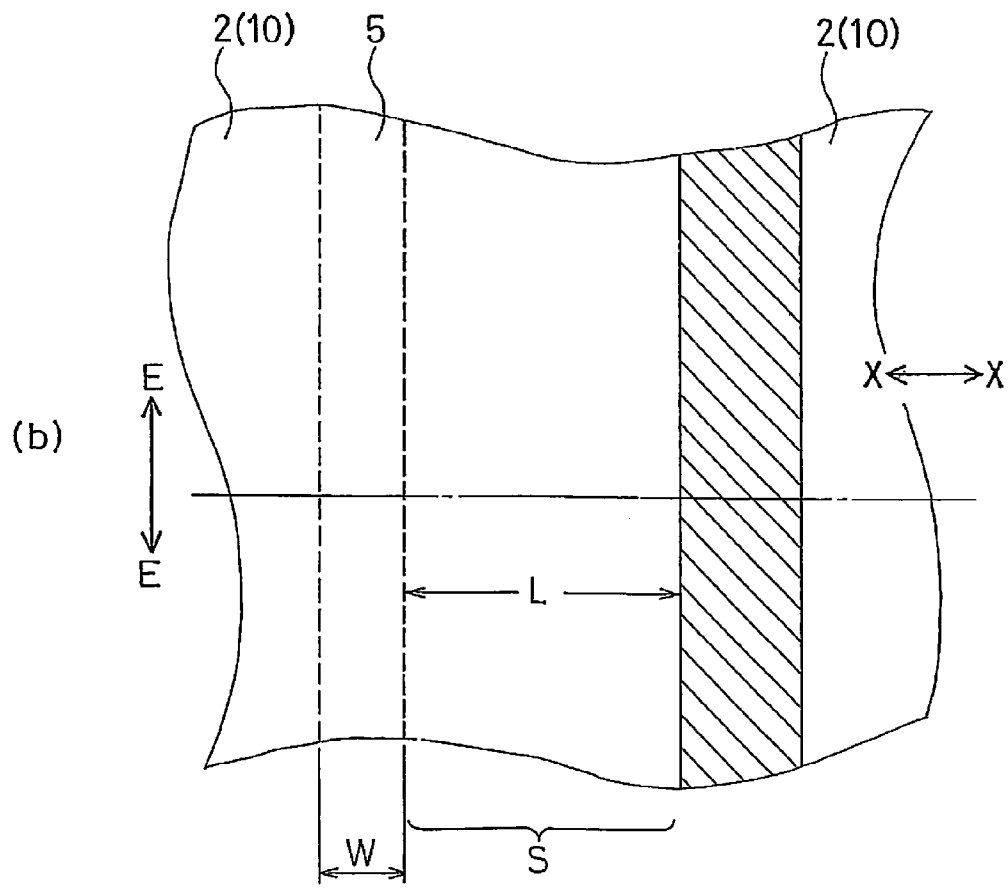
Figure 6:
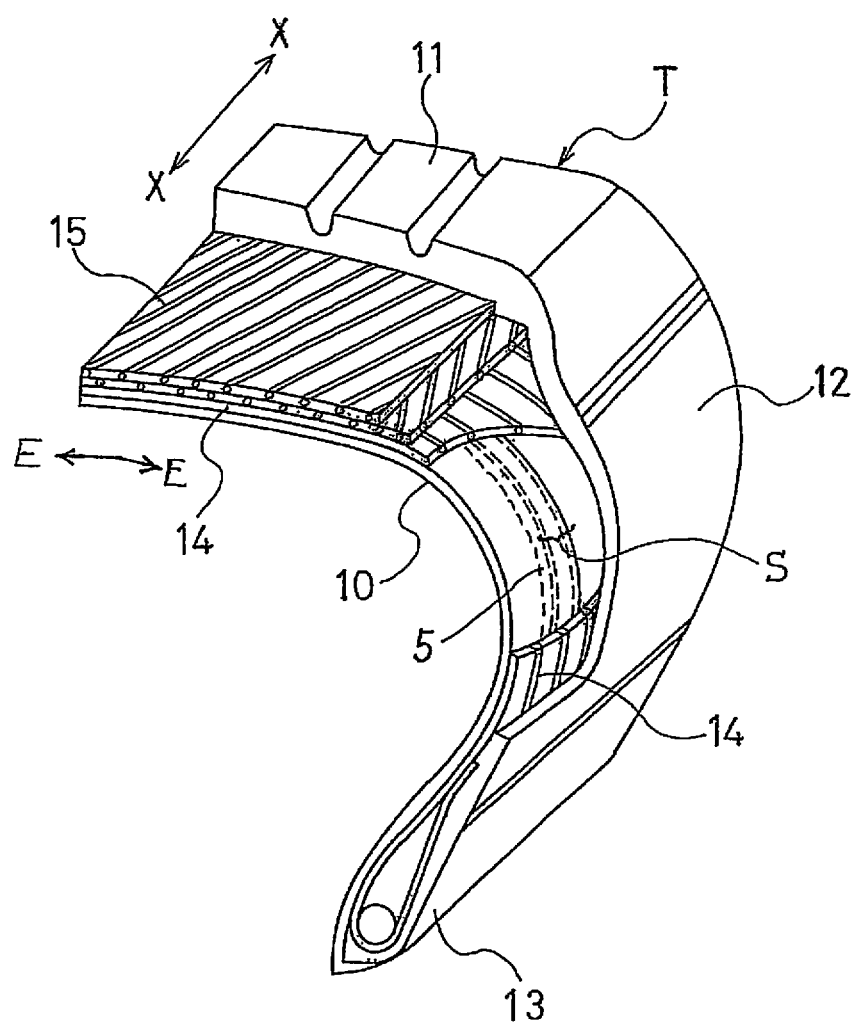
FIG. 6 is a partial cutaway perspective view showing an example of an embodiment of the pneumatic tire as shown in FIGS. 1(a) and 1(b)
Figure 8:
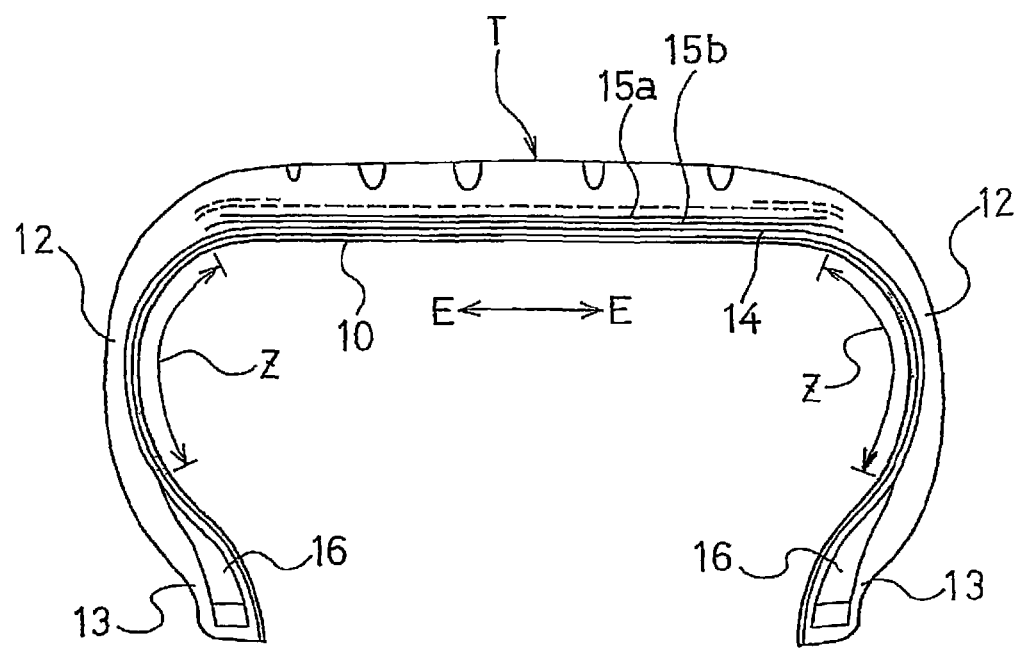
FIG. 8 is a cross-sectional view taken along a tire meridian line which is used to explain the pneumatic tire of the embodiments disclosed herein, and shows, as an example, regions in the film mainly made of the thermoplastic resin constituting the inner liner where it is preferable to provide a thin portion at least before the lap-splice portion, in the state where the lap-splice portion exits over the entire width in a tire widthwise direction E.

As shown in FIGS. 1(a) and 1(b), in a pneumatic tire according to one embodiment, an inner liner 10 including a film 2 mainly made of a thermoplastic resin is attached to an inside of the tire via a tie rubber sheet 3, on an inner side of a carcass layer 14 as shown in FIGS. 6 and 8. Moreover, the pneumatic tire has a lap-splice portion S where end portions of the film 2 in a tire circumferential direction overlap each other in the tire widthwise direction with tie rubber 3' therebetween. The pneumatic tire is characterized in that a section of the film 2 on a tire cavity side in the lap-splice portion S has a portion 5 where the film 2 is thin over part or entirety of the width in the tire widthwise direction, before the lap-splice portion S.

Various studies have been made on causes of delamination between the film 2 mainly made of the thermoplastic resin which constitutes the inner liner 10 and the tie rubber sheet 3 cured and adhered to the film mainly made of the thermoplastic resin. The delamination is a disadvantage of the conventional method.

Specifically, the delamination is considered to occur as follows in the case where the above-described laminated sheet 1 is prepared by a normal method. Around the lap-splice portion S of both ends of the laminated sheet 1 shown in FIGS. 5(a) and 5(b), large stress occurs in the tie rubber 3' interposed between the end portions of the film 2 mainly made of the thermoplastic resin and having large stiffness, with the end portions exiting above and below the tie rubber 3'. As a result, a crack develops in a vicinity 4 of tip portions of the film 2 mainly made of the thermoplastic resin. Then, the crack becomes larger and delamination thereby occurs.

On the contrary, in the pneumatic tire as shown in FIGS. 1(a) and 1(b), the section of the film 2 on the tire cavity side in the lap-splice portion S has the portion 5 where the film 2 is thin over part or entirety of the width length in the tire widthwise direction E-E, before the lap-splice portion S. When the laminated sheet 1 is prepared by being cut into a predetermined length, a film having the portion 5 where the film is thin over part or entirety of the width in the tire widthwise direction E-E before the lap-splice portion S is prepared as the film 2 mainly made of the thermoplastic resin.

Providing the portion 5 where the film 2 is thin over part or entirety of the width in the tire widthwise direction E-E before the lap-splice portion S facilitates bending at the portion 5 where the thickness is small and drastically reduces the occurrence of peeling off. A pneumatic tire excellent in durability can be thereby obtained. This exerts a significant effect in preventing phenomenon of delamination between the film 2 mainly made of the thermoplastic resin and the tie rubber sheet 3 cured and adhered thereto after the tire starts to be used for running.

It is important that the portion 5 where the film 2 is thin is provided before the lap-spliced portion S. If the portion 5 is provided in lap-spliced portion where the end portions of the film 2 overlap each other, the section of the film 2 mainly made of the thermoplastic resin is restrained by the section of the film 2 mainly made of the thermoplastic resin on the lower side in the drawing and is thereby difficult to bend.

Accordingly, it is difficult to obtain the aforementioned effect of reducing the occurrence of peeling off.

In the pneumatic tire as shown in FIGS. 1(a) and 1(b), a circumferential-direction overlap length L of the lap-splice portion S is preferably 3 to 30 mm, a tire-circumferential-direction length W of the portion 5 where the film 2 is thin is preferably 0.1 to 10 mm, and a thickness t of the portion 5 where the film 2 is thin is preferably 20 to 80% of a thickness T of the film 2. If the circumferential-direction overlap length L of the lap-splice portion S is smaller than 3 mm, it is difficult for the lap-splice portion S to exert a joint effect as a splice portion. On the other hand, the circumferential-direction overlap length L of the lap-splice portion S being larger than 30 mm causes deterioration of the uniformity of the tire and is thus undesirable. Moreover, the tire-circumferential-direction length W of the portion 5 where the film 2 is thin being smaller than 0.1 mm is undesirable because processing of accurately forming the portion 5 becomes difficult. Meanwhile, the length W being larger than 10 mm is undesirable because the effect is not improved by a degree corresponding to the increased length W and, even worse, there is possibly deterioration in air permeation preventing performance as the inner liner. A more preferable range of the tire-circumferential-direction length W of the portion 5 where the film 2 is thin is 1 to 5 mm.

Figure 2:
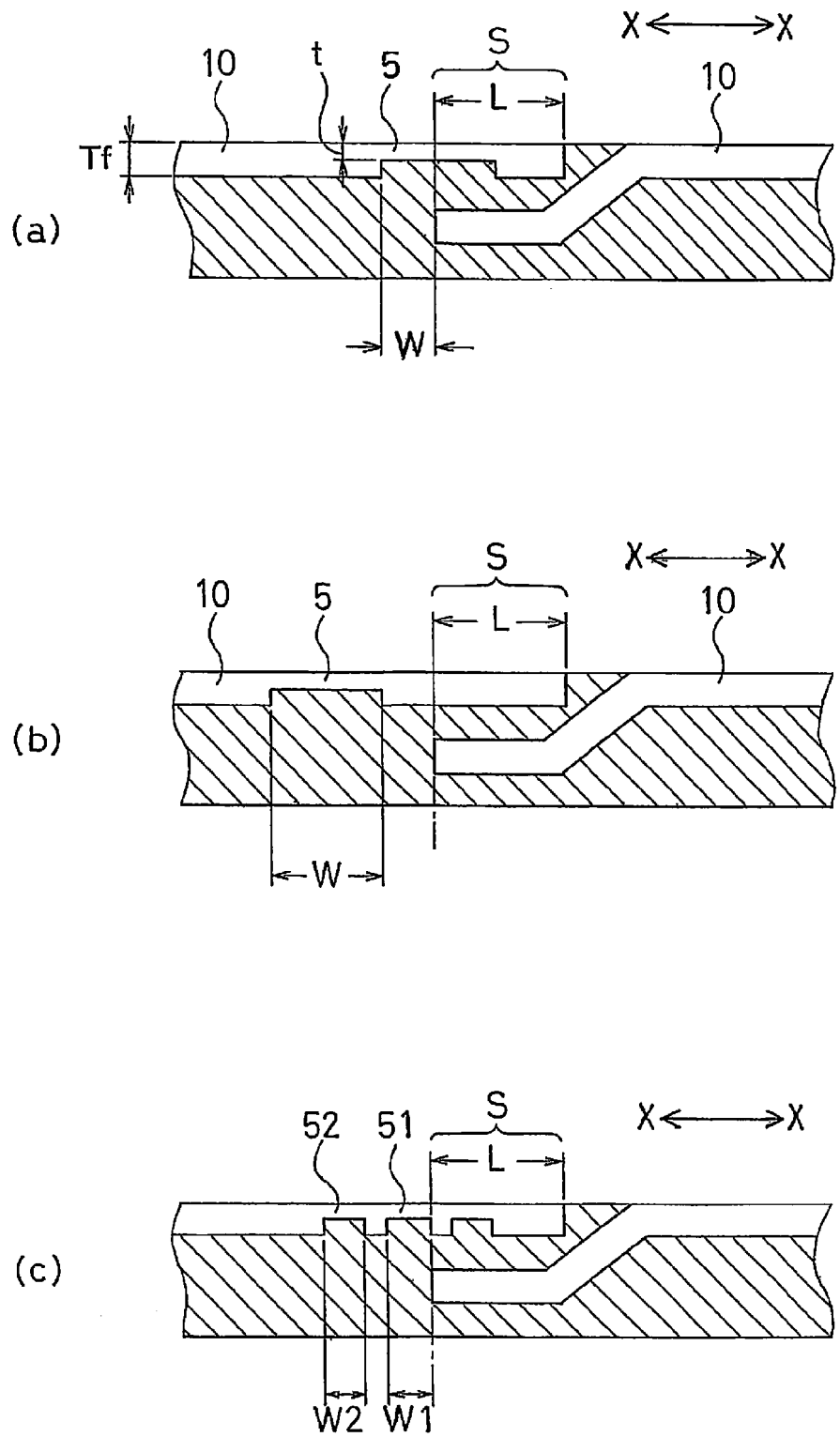
FIGS. 2(a), 2(b) and 2(c) are cross-sectional views around the lap-splice portion of different configurations of the pneumatic tire as shown in FIGS. 1(a) and 1(b)

The values respectively of the circumferential-direction overlap length L of the lap-splice portion S and the tire-circumferential-direction length W of the portion 5 where the film 2 is thin and the positional relationship of the portion 5 where the film 2 is thin are as follows. As shown in FIGS. 2(a) through 2(c) in various embodiments, the circumferential-direction overlap length L of the lap-splice portion S is a circumferential direction length of a portion where the end portions of the film 2 overlap each other, irrespective of the position of the portion 5 where the film 2 is thin. Moreover, the technical idea is determining the tire-circumferential-direction length of the portion where the film 2 is thin over part or entirety of the width in the tire widthwise direction, before the lap-splice portion S. Accordingly, the tire-circumferential-direction length W of the portion 5 where the film 2 is thin refers to a configuration as shown in FIG. 2(a) when the portion 5 where the film 2 is thin exists partially overlapping the lap-splice portion S, a length W excluding a section where the portion 5 overlaps the lap slice portion S, a configuration as shown in FIG. 2(b) when the portion 5 where the film 2 is thin exists without overlapping the lap-splice portion S, an entire length W of the portion 5 where the film 2 is thin, or a configuration as shown in FIG. 2(c) when a plurality of portions 5 where the film 2 is thin exist and there are a portion 5 overlapping the lap-splice portion S and a portion 5 not overlapping the lap-splice portion S, a total length of lengths of the portions 5 (51 and 52 in FIG. 2(c)) existing without overlapping the lap-splice portion S (part of the portions exiting without overlapping (W1+W2 in FIG. 2(c)).

Further details of the pneumatic tire as shown in FIGS. 1(a) through 2(c) as shown in FIG. 6 which is a partial cutaway perspective view showing an example of an embodiment of a pneumatic tire. A pneumatic tire T includes a side wall part 12 and a bead part 13 in a continuous fashion on each of the left and right sides of a tread part 11. Inside the tire, a carcass layer 14 serving as the tire's framework is provided extending in the tire widthwise direction between the left and right bead parts 13 and 13. Two belt layers 15 made of steel cords are provided on the outer circumferential side of a portion of the carcass layer 14 corresponding to the tread part 11. An arrow E indicates the tire widthwise direction and an arrow X indicates the tire circumferential direction. The inner liner layer 10 is disposed on the inner side of the carcass layer 14, and the lap-splice portion S thereof exists extending in the tire widthwise direction.

In the pneumatic tire as shown, the development of a crack on the tire's inner circumferential surface around the lap-splice portion S, which is likely to develop in the conventional case, is suppressed. Moreover, the development of a crack and the occurrence of delamination between the film 2 mainly made of the thermoplastic resin which constitutes the inner liner layer 10 and the tie rubber layer 3, are suppressed. Thus, durability is significantly improved. The overlap length L of the lap-splice portion S is preferably 5 to 10 mm, depending on the tire size.

Also in the pneumatic tire, the splice portion S formed by overlapping exists over the entire tire width. However, the portion 5 where the film 2 is thin is not required to be provided over the entire width of the splice portion S. It is preferable that the portion 5 exists, in the tire widthwise direction, at least in regions each from one end portion of a belt 15b having a larger width to a front end portion of a corresponding one of bead fillers 16 which are denoted by Z in FIG. 8. Deformation is large particularly around shoulder portions during running and crack and delamination of the tie rubber are thereby likely to occur. Hence, it is preferable that the portion 5 is provided at least in the regions Z including side wall portions. In other words, the portion 5 where the film 2 is thin is not required to continuously extend to exist over the entire width in the tire widthwise direction and may exist only over part of the width in the tire widthwise direction. When the portion 5 exists, it is preferable that the portion 5 exists at least in the region Z each from the end portion of the belt 15b having a larger width to the front end portion of the corresponding bead filler 16.

Figure 3:
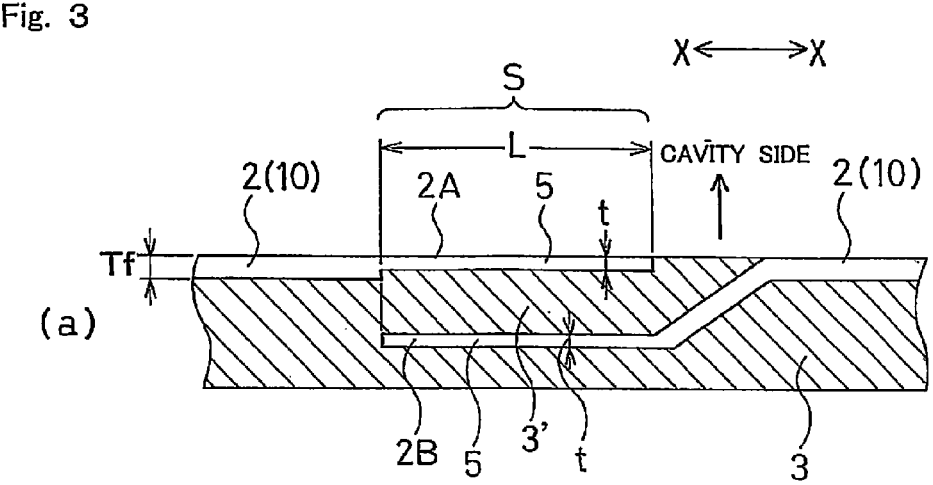
FIGS. 3(a) and 3(b) illustrate a portion of a pneumatic tire according to another disclosed embodiment, with FIG. 3(a) being a side cross-sectional view around the lap-splice portion, and FIG. 3(b) being a plan view of the lap-splice portion.
Figure 3:
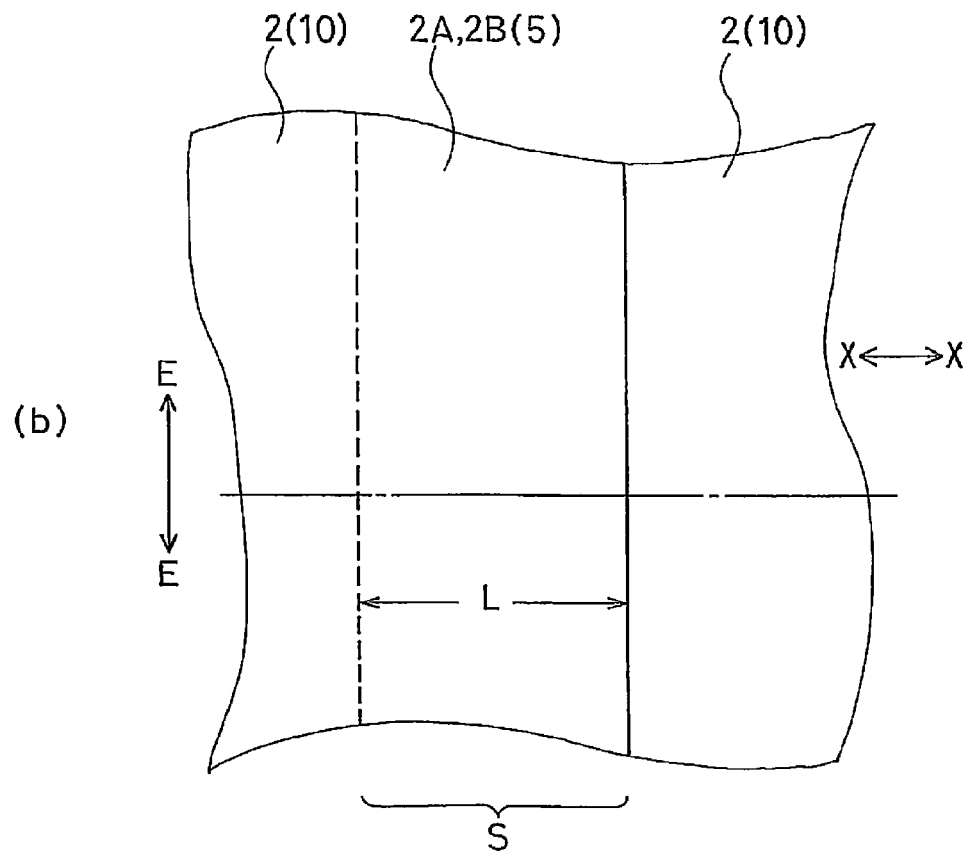
Figure 7:
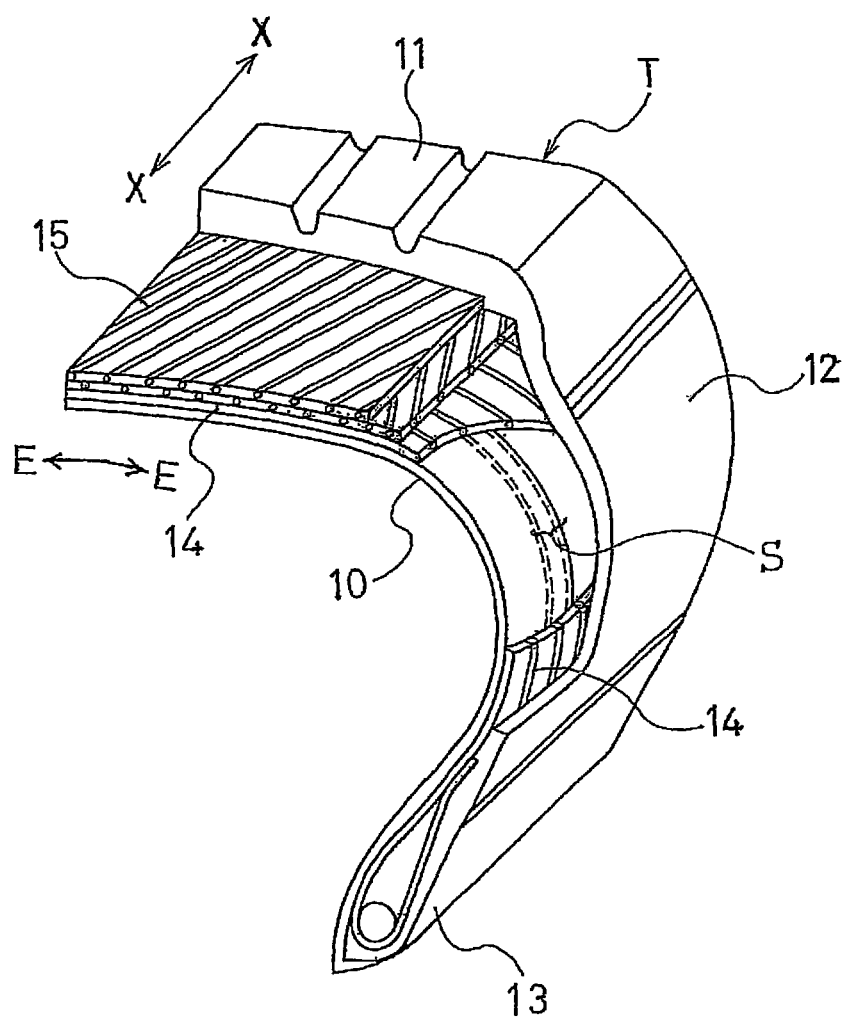
FIG. 7 is a partial cutaway perspective view showing an example of an embodiment of the pneumatic tire as shown in FIGS. 3(a) and 3(b)

As mentioned above, FIGS. 3(a) and 3(b) illustrate a pneumatic tire of another embodiment. In the pneumatic tire, an inner liner 10 including a film 2 mainly made of a thermoplastic resin is attached to an inside of the tire via a tie rubber sheet 3, on an inner side of a carcass layer 14 as shown in FIGS. 7 and 8. Moreover, the pneumatic tire has a lap-splice portion S where end portions of the film 2 in a tire circumferential direction overlap each other in the tire widthwise direction with tie rubber 3' therebetween. The pneumatic tire is characterized in that at least one of a film section 2A on a tire cavity side and a film section 2B on a tire outer circumference side in the lap-splice portion S is formed in such a way that a film thickness in the lap-splice portion S is smaller than a film thickness in a portion other than the lap-splice portion S. In FIGS. 1(a) and 1(b), reference numeral 5 denotes a film portion formed to be thin. In the embodiment shown in FIGS. 3(a) and 3(b), both of the film section 2A on the tire cavity side and the film section 2B on a tire outer circumference side are formed to be thinner than the film thickness in the portion other than the lap-splice portion.

As mentioned in the description of the embodiment shown in FIGS. 1(a) and 1(b), the delamination is considered to occur as follows in the case where a laminated sheet 1 is prepared by a normal method. Around the lap-splice portion S of both ends of the laminated sheet 1 shown in FIGS. 5(a) and 5(b), large stress occurs in the tie rubber 3' interposed between both end portions of the film 2 mainly made of the thermoplastic resin and having large stiffness, the end portions existing above and below the tie rubber 3'. As a result, a crack develops in a vicinity 4 of tip portions of the film 2 mainly made of the thermoplastic resin. Then, the crack becomes larger and delamination thereby occurs.

On the other hand, in the embodiment shown in FIGS. 3(a) and 3(b), at least one of the upper and lower film sections is the film portion 5 formed to be thin, in the lap-splice portion S. Accordingly, the stiffness of the entire lap-splice portion S is reduced and this facilitates bending of the lap-splice portion S as a whole. Hence, occurrence of peeling off and delamination between the film and the tie rubber can be drastically reduced and a pneumatic tire excellent in durability can be thereby obtained. This exerts a significant effect in preventing phenomenon of delamination between the film 2 mainly made of the thermoplastic resin and the tie rubber sheet 3 cured and adhered thereto after the tire starts to be used for running.

Figure 4:
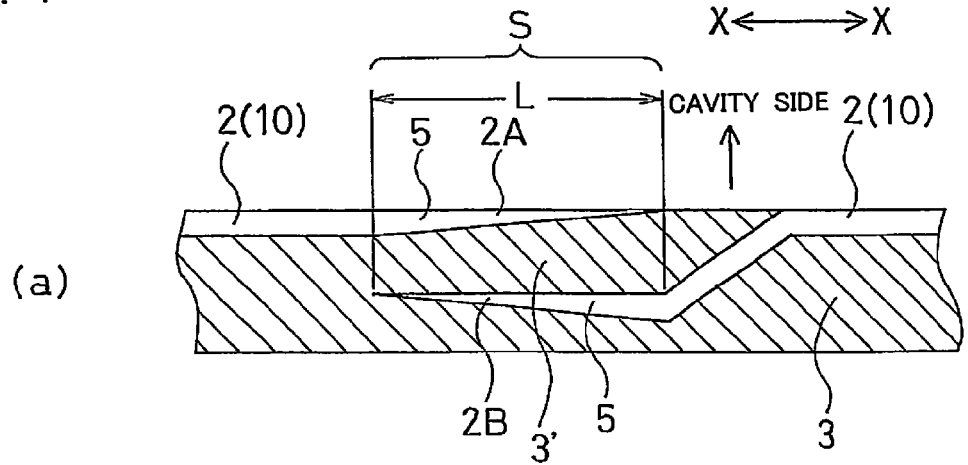
FIGS. 4(a), 4(b) and 4(c) are cross-sectional views around the lap-splice portion of different configurations of the pneumatic tire as shown in FIGS. 3(a) and 3(b)
Figure 4:
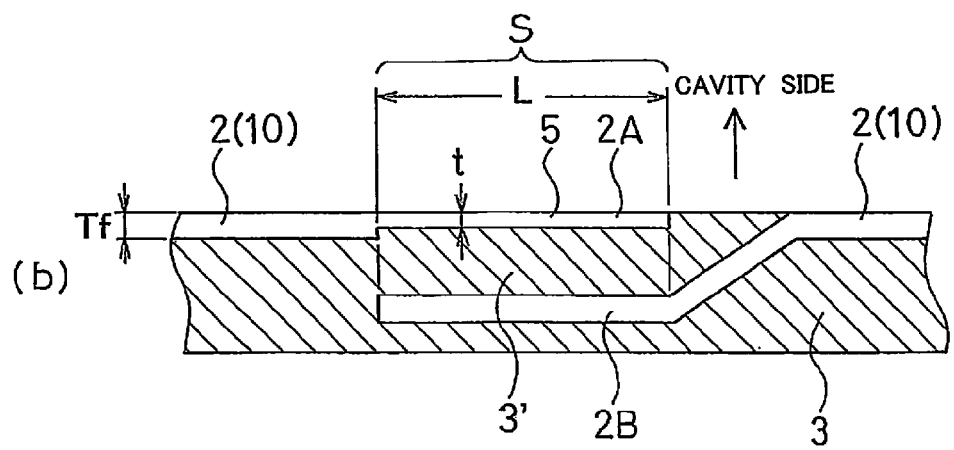
Figure 4:
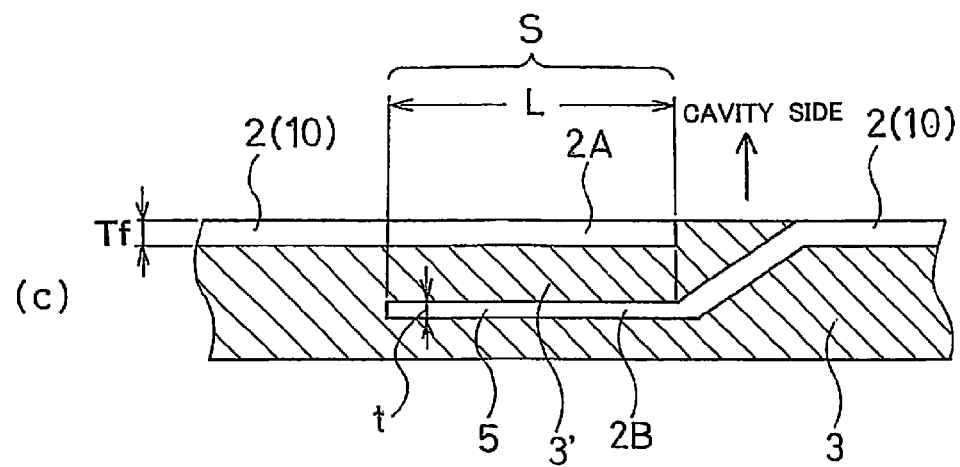

In the lap-splice portion S, the film portion 5 formed to be thinner than the film thickness of the portion other than the lap-splice portion has such a shape that a shape of a cross section along the tire circumferential direction X-X gradually becomes thinner toward the tip as shown in FIG. 4(a), or such a shape that the shape of the cross section becomes thinner stepwise as shown in FIGS. 4(b) and 4(c). Although the stepwise shapes shown in FIGS. 4(b) and 4(c) each have one step, multiple steps may be provided.

Moreover, only the film section 2A on the tire inner cavity side may be formed to be thin as shown in FIG. 4(b) or only the film section 2B on the tire outer circumferential side may be formed to be thin as shown in FIG. 4(c). Thus, in a case of thinning only one of the film sections, it is preferable to thin the film section 2A on the tire inner cavity side as shown in FIG. 4(b). This is considered to be because a larger effect of reduction in stiffness is obtained by thinning the film section located in a surface, and peeling off and delamination are thereby less likely to occur.

Processing of thinning the film is performed in a stage where the film is a single body and is not laminated with the tie rubber sheet yet, by performing, for example, laser processing in the tire widthwise direction. In some cases, properties of a film surface are modified by the laser processing and adhesiveness to the tie rubber sheet thereby deteriorates. In such case, it is preferable to thin the film by performing the laser processing on a surface which is not to be brought into contact with the tie rubber sheet. Description is given specifically by using the embodiment shown in FIG. 4(b). In the embodiment shown in FIG. 4(b), the film section 2A on the tire inner cavity side is thinned and the thinning is performed on a surface of the film section 2A on the tie rubber sheet side. In the case where the adhesiveness of the processed surface deteriorates by the processing of thinning, it is preferable to perform thinning on a surface on the inner cavity side which is opposite to the surface on the tie rubber sheet side. On the other hand, when the adhesiveness of the processed surface improves by the processing of thinning, it is preferable to set the surface on the tie rubber sheet to the surface to be processed to be thin because the effect of preventing the peeling off and delamination can be improved.

In the case of thinning the film stepwise as described above, a thickness t of the film formed to be thin in the lap-splice portion is preferably 20 to 80% of a thickness Tf of the film in the portion other than the lap-splice portion (FIG. 3(a) and FIGS. 4(b) and 4(c)). If the film is thinned excessively, an excellent air permeation preventing performance as the inner liner cannot be obtained and molding workability also deteriorates. The thickness t being larger than 80% of the thickness Tf is undesirable because the effect of reduction in stiffness is small and it becomes difficult to obtain a desired effect.

In the pneumatic tire as shown in FIGS. 3(a) and 3(b), the overlap length L of the lap-splice portion S in the tire circumferential direction shown is preferably 3 to 30 mm. If the circumferential-direction overlap length L of the lap-splice portion S is smaller than 3 mm, it is difficult for the lap-splice portion S to exert a joint effect as a splice portion. On the other hand, the circumferential-direction overlap length L of the lap-splice portion S being larger than 30 mm may cause deterioration of the uniformity of the tire and is thus undesirable. The preferable dimensions are the same as those in the pneumatic tire shown in FIGS. 1(a) and 1(b).

Moreover, the film portion 5 where the film 2 is thin is preferably formed to have a tire-circumferential-direction length almost equal to the overlap length L. Specifically, the tire-circumferential-direction length is preferably within a range of plus/minus 15% of the length L, more preferably within a range of plus/minus 10% of the length L.

As shown in more detail in FIG. 7, pneumatic tire T includes a side wall part 12 and a bead part 13 in a continuous fashion on each of the left and right sides of a tread part 11. Inside the tire, a carcass layer 14 serving as the tire's framework is provided extending in the tire widthwise direction between the left and right bead parts 13 and 13. Two belt layers 15 made of steel cords are provided on the outer circumferential side of a portion of the carcass layer 14 corresponding to the tread part 11. An arrow E indicates the tire widthwise direction and an arrow X indicates the tire circumferential direction. The inner liner layer 10 is disposed on the inner side of the carcass layer 14, and the lap-splice portion S thereof exists extending in the tire widthwise direction.

In the pneumatic tire, the development of a crack on the tire's inner circumferential surface around the lap-splice portion S, which is likely to develop in the conventional case, is suppressed. Moreover, the development of a crack and the occurrence of delamination between the film 2 made mainly of the thermoplastic resin, which constitutes the inner liner layer 10 and the tie rubber layer 3, are suppressed. Thus, durability is significantly improved.

The splice portion S formed by overlapping exists over the entire tire width. However, the portion 5 where the film 2 is thin is not required to be provided over the entire width of the splice portion. It is preferable that the portion 5 exists, in the tire widthwise direction, at least in regions each from one end portion of a belt 15b having a larger width to a front end portion of a corresponding one of bead fillers 16 which are shown as regions Z in FIG. 8. Deformation is large particularly around shoulder portions during running and crack and delamination of the film and the tie rubber are thereby likely to occur. Hence, it is preferable that the portion 5 is provided at least in the regions Z including side wall portions. This is the same as in the pneumatic tire as shown in FIGS. 1(a) and 1(b).

As can be appreciated from the description herein, the film mainly made of the thermoplastic resin constituting the inner liner typically refers to a film made of a thermoplastic resin or a film made of a thermoplastic resin composition obtained by blending a thermoplastic resin and an elastomer with the thermoplastic resin being a main component. The same film is used in the embodiments discussed herein. Particularly, even in the case where the film is made of the thermoplastic resin composition obtained by blending the thermoplastic resin and the elastomer with the thermoplastic resin being the main component, the main component is the thermoplastic resin. The film mainly made of the thermoplastic resin has such a characteristic that the stiffness thereof is generally larger than that of a sheet made of 100% rubber.

In this regard, in order to increase the life the pneumatic tire, it is extremely important to employ a configuration in which a portion of the inner liner around the splice portion is protected, as the configurations of the pneumatic tires described herein. Examples of the thermoplastic resin usable in the pneumatic tires include: polyamide-based resins [for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 9T, nylon 6/6T copolymers, nylon 66/PP copolymers, and nylon 66/PPS copolymers]; their N-alkoxyalkylates, for example, methoxymethylated nylon 6, methoxymethylated nylon 6/610 copolymers, and methoxymethylated nylon 612; polyester-based resins [for example, aromatic polyesters such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers]; polynitrile-based resins [for example, polyacrylonitrile (PAN), polymethacrylonitrile, acrylonitrile/styrene copolymers (AS), (meth)acrylonitrile/styrene copolymers, and (meth)acrylonitrile/styrene/butadiene copolymers]; polymethacrylate-based resins [for example, polymethyl methacrylate (PMMA) and polyethylmethacrylate]; polyvinyl-based resins [for example, polyvinyl acetate, polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methyl acrylate copolymers, and vinylidene chloride/acrylonitrile copolymers (ETFE)]; cellulose-based resins [for example, cellulose acetate and cellulose acetate butyrate]; fluororesins [for example, polyvinylidene fluoride (PVDF), polyvinyl fluoride (PVF), polychlorofluoroethylene (PCTFE), and tetrafluoroethylene/ethylene copolymers]; imide-based resins [for example, aromatic polyimide (PI)]; and the like.

Moreover, any of the resins described above is usable as the thermoplastic resin out of the thermoplastic resin and the elastomer which can constitute the example of the thermoplastic resin composition mainly made of the thermoplastic resin usable in the present invention. Meanwhile, examples of the preferably-usable elastomer include: diene rubbers and their hydrogenated products [for example, natural rubbers (NR), isoprene rubber (IR), epoxidized natural rubbers, styrene-butadiene rubber (SBR), butadiene rubbers (BR, high-cis BR and low-cis BR), nitrile rubber (NBR), hydrogenated NBR, and hydrogenated SBR]; olefin-based rubbers [for example, ethylene propylene rubbers (EPDM and EPM), maleic acid-modified ethylene propylene rubber (M-EPM), butyl rubber (IIR), copolymers of isobutylene and aromatic vinyl or diene monomer, acrylic rubber (ACM), and ionomers]; halogen-containing rubbers [for example, Br-IIR, Cl-IIR, brominated isobutylene-co-paramethylstyrene copolymers (BIMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)]; silicone rubbers [for example, methyl vinyl silicone rubber, dimethyl silicone rubber, and methylphenylvinyl silicone rubber]; sulfur-containing rubbers [for example, polysulfide rubber]; fluororubbers [for example, vinylidene fluoride-based rubbers, fluorine-containing vinyl ether-based rubbers, tetrafluoroethylene-propylene-based rubbers, fluorine-containing silicone-based rubbers, and fluorine-containing phosphazene-based rubbers]; thermoplastic elastomers [for example, styrene-based elastomers, olefin-based elastomers, ester-based elastomers, urethane-based elastomers, and polyamide-based elastomers]; and the like.

At the time of blending in a combination of a specific one of the above-mentioned thermoplastic resins and a specific one of the above-mentioned elastomers, an appropriate compatibilizer may be used as a third component to make the thermoplastic resin and the elastomer compatible with each other if they are incompatible with each other. The interfacial tension between the thermoplastic resin and the elastomer decreases when such a compatibilizer is mixed in the blend system. As a result, the size of elastomer particles constituting the dispersion phase becomes finer. Accordingly, these two components exhibit their characteristics more effectively. In general, such a compatibilizer may have a copolymer structure including both or either of a structure of the thermoplastic resin and a structure of the elastomer, or a copolymer structure including an epoxy group, a carbonyl group, a halogen group, an amino group, an oxazoline group, a hydroxyl group, or the like, which is capable of reacting with the thermoplastic resin or the elastomer. Such a compatibilizer may be selected depending on the types of the thermoplastic resin and the elastomer with which the compatibilizer is blended. Examples of the compatibilizer normally used include: styrene/ethylene-butylene-styrene block copolymers (SEBS) and their maleic acid-modified products; EPDM; EPM; EPDM/styrene or EPDM/acrylonitrile graft copolymers and their maleic acid-modified products; styrene/maleic acid copolymers; reactive phenoxine; and the like. The blending proportion of such a compatibilizer is not particularly limited, yet the blending proportion is preferably 0.5 to 10 parts by weight per 100 parts by weight of the polymer components (the total amount of the thermoplastic resin and the elastomer).

In the thermoplastic resin composition obtained by blending a thermoplastic resin and an elastomer, the composition ratio of the specific thermoplastic resin to the specific elastomer is not particularly limited. This composition ratio may be set as appropriate in such a way that the thermoplastic resin is the main component and the thermoplastic resin composition has a structure in which the elastomer is dispersed as a discontinuous phase in the matrix of the thermoplastic resin.

In the pneumatic tires, the film mainly made of the thermoplastic resin may be mixed with other polymers such as the compatibilizer, as long as the other polymers do not impair the characteristics needed for the inner liner. The purposes of mixing such other polymers are to improve the compatibility between the thermoplastic resin and the elastomer, to improve molding processability of the materials, to improve heat resistance, to reduce costs, and so on. Examples of materials used for such other polymers include polyethylene (PE), polypropylene (PP), polystyrene (PS), ABS, SBS, polycarbonate (PC), and the like. In addition, a filler (calcium carbonate, titanium oxide, alumina, or the like) generally blended in the polymer blend, a reinforcing agent such as carbon black and white carbon, a softener, a plasticizer, a processing aid, a pigment, a dye, an antioxidant, and the like may be blended optionally as long as the blended materials do not impair the characteristics needed for the inner liner. The thermoplastic resin composition has a structure in which the elastomer is dispersed as a discontinuous phase in the matrix of the thermoplastic resin. Having such a structure, this thermoplastic resin composition can provide the inner liner both with sufficient flexibility and with sufficient stiffness based on the effect of a resin layer as a continuous phase. At the same time, when this thermoplastic resin composition is molded, the thermoplastic resin composition can achieve the molding processability equivalent to that of the thermoplastic resin, regardless of the amount of the elastomer. The Young's modulus of each of the thermoplastic resin and the elastomer usable in the pneumatic tires is not particularly limited, yet is set preferably to 1 to 500 MPa and more preferably to 50 to 500 MPa.

EXAMPLES

Hereinbelow, the pneumatic tires described herein will be specifically described with reference to examples.

Note that evaluated characteristics were measured by the methods described below.

(1) Evaluation of Delamination Resistance in Splice Portion:

Running test was performed for each of test tires (10 tires prepared for each of Examples and Conventional Examples) for 80 hours by using a drum testing machine under such a condition that an inflation pressure was 120 kPa, a load was 7.24 kN, and a speed was 81 km/h. Thereafter, presence and absence of development of a crack and delamination of the tie rubber around the splice portion of the inner liner layer of the inner cavity were observed for each test tire.

The evaluation was performed in such a method that Conventional Example 1 and Examples 1 to 6 related to the first embodiment were evaluated and categorized into three levels of "excellent," "normal," and "not acceptable." Moreover, evaluation of Conventional Example 11 and Examples 11 to 17 related to the embodiments described with regard to FIGS. 3(a) through 4(c) was performed with the delamination resistance of Conventional Example 11 taken as an index of 100. A larger index means better delamination resistance.

(2) Evaluation of Air Leakage:

Each of the test tires was mounted on a rim and inflated to 230 kPa. Thereafter, the test tire was left for one month to calculate a leakage rate of air pressure. In the evaluation, the air leakage resistance of each of Conventional Example 1 and Examples 1 to 6 related to the embodiment described with regard to FIGS. 1(a) through 2(c) was indicated in an index with the air leakage resistance of the tire of Conventional Example 1 taken as an index of 100. The air leakage resistance of each of Conventional Example 11 and Examples 11 to 17 related to the second invention was indicated in an index with the air leakage resistance of the tire of Conventional Example 11 taken as an index of 100.

A larger index means better air leakage resistance. An index greater by 5% is judged as better.

(3) Evaluation of Uniformity:

The evaluation was performed by measuring RFV (Radial force variation) according to JASO (Japanese Automotive Standards Organization) C-607-87.

The number of samples was ten and the uniformity of each of Conventional Example 1 and Examples 1 to 6 related to the embodiment described with regard to FIGS. 1(a) through 2(c) was indicated in an index with the uniformity of the tire of Conventional Example 1 taken as an index of 100. The uniformity of each of Conventional Example 11 and Examples 11 to 17 related to the embodiment described in FIGS. 3(a) through 4(c) was indicated in an index with the uniformity of the tire of Conventional Example 11 taken as an index of 100. A larger index means better uniformity. An index greater by 2% or more is judged as "better" and an index greater by 5% or more is judged as "significantly better."

Examples 1 to 6 and Conventional Example 1

Examples 1 to 6 and Conventional Example 1 are related to the pneumatic tire of the embodiment described with regard to FIGS. 1(a) through 2(c). As each of test tires, a test tire having a tire size of 195/65R15 91H (15×6J) and having a tire structure with two belt layers and two carcass layers was prepared. Ten tires were prepared for each of Examples and Conventional Example. In each of the test tires, a film having a thickness (Tf) of 130 μm and made of N6/66 as the thermoplastic resin was used as the film mainly made of the thermoplastic resin and constituting the inner liner. The making of the tire was performed in such a way that the lap-splice portion S had the structure shown in FIG. 1 and that the portion 5 where the film 2 was thin over the entire width in the tire widthwise direction was provided before the lap-splice portion S to be almost in contact with an end portion of the lap-splice portion.

As shown in Table 1, Examples 1 to 6 were varied in the circumferential-direction overlap length L of the lap-splice portion and the tire-circumferential-direction length W of the portion 5 where the film was thin. The Conventional Example 1 was an example in which the film mainly made of the thermoplastic resin and constituting the inner liner was provided with particularly no portion 5 where the film was thin.

In each of Examples 1 to 6, the thickness t of the portion 5 where the film (inner liner) is thin was 70 μm. The evaluation results of each test tire are shown in Table 1. As can be seen from these results, the pneumatic tire of the embodiment described with regard to FIGS. 1(a) through 2(c) is excellent in delamination resistance of the splice portion, air leakage resistance, and uniformity.

TABLE 1

|  | Conventional Example 1 | Example 1 | Example 2 | Example 3 | Example 4 | Example 5 | Example 6 |
|---|---|---|---|---|---|---|---|
| Circumferential-direction overlap length L of lap-splice portion (mm) | 7 | 7 | 7 | 7 | 7 | 2 | 40 |
| Tire-circumferential direction length W of portion where film is thin (mm) | 0 (null) | 0.1 | 0.5 | 3 | 10 | 20 | 5 |
| Delamination resistance | excellent | normal to excellent | excellent | excellent | excellent | normal | excellent |

TABLE 1-continued

|  | Conventional Example 1 | Example 1 | Example 2 | Example 3 | Example 4 | Example 5 | Example 6 |
|---|---|---|---|---|---|---|---|
| Air leakage resistance | 100 | 100 | 100 | 99 | 95 | 94 | 99 |
| Uniformity | 100 | 100 | 100 | 100 | 100 | 103 | 94 |

Examples 11 to 17 and Conventional Example 11

Examples 11 to 17 and Conventional Example 11 are related to the pneumatic tire described with regard to FIGS. 3(a) through 4(c). As of each test tires, a test tire having a tire size of 195/65R15 91H (15×6J) and having a tire structure with two belt layers and two carcass layers was prepared. Ten tires were prepared for each of Examples 11 to 17 and Conventional Example 11. In each of the test tires, a film having a thickness of 130 μm and made of N6/66 as the thermoplastic resin was used as the film mainly made of the thermoplastic resin and constituting the inner liner.

The film of each of Examples 11 to 17 was cut into a desired length and a desired width and was thinned as described in the specifications shown in Table 2 by performing processing of repeatedly exposing both end portions of the film in the tire circumferential direction to a laser beam in the tire widthwise direction. The conventional example 11 was an example provided with particularly no portion where the film was thin.

Table 2 shows, for each of the lap-splice portions S, the length of the lap-splice (L mm), the side cross-sectional shape around the lap-splice portion, and a ratio of the thickness t of the thinned portion to the thickness Tf (130 μm) of the film which is expressed in percent (%). The evaluation result of delamination resistance of the splice portion and the evaluation result of uniformity are shown in Table 2 for each of the test tires. As can be seen from these results, the pneumatic tire of the embodiment described with regard to FIGS. 3(a) through 4(c) is excellent in delamination resistance of the splice portion and in uniformity.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "outboard", "inboard", "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention. The terms of degree such as "generally", "substantially", "about" and "approximately" as used herein mean a reasonable amount of deviation of the modified term such that the end result is not significantly changed. For example, two members that are angled less than ten degrees apart would be considered "generally perpendicular", but two members that are angled more than fifteen degrees apart would not be considered "generally perpendicular".

TABLE 2

Figure 5:
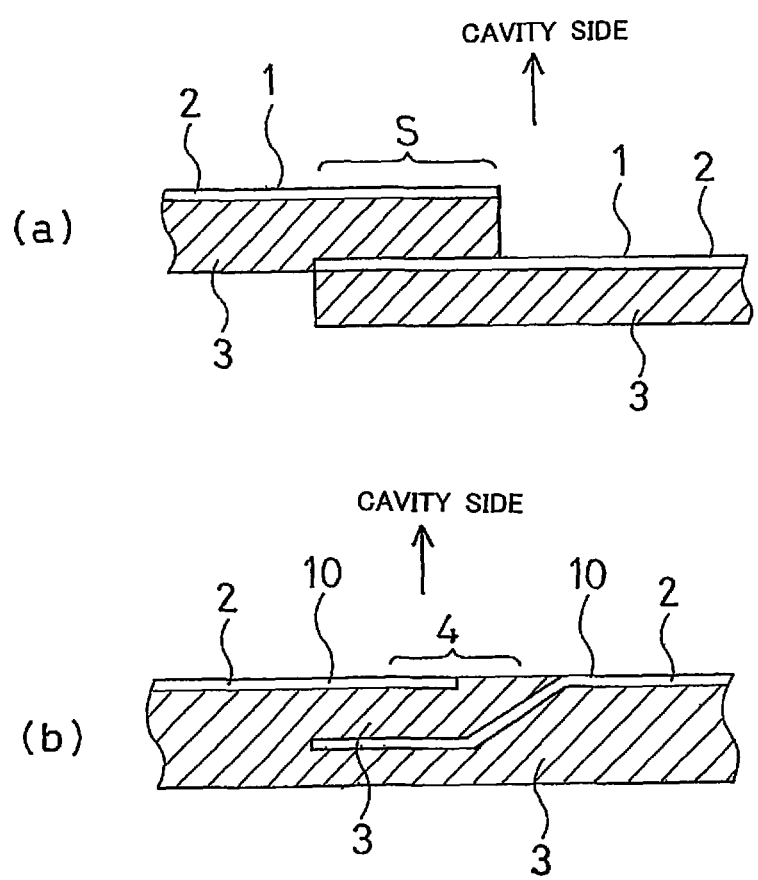
FIGS. 5(a) and 5(b) are cross-sectional views for illustrating a disadvantage of a conventional pneumatic tire, with FIG. 5(a) showing the state where a laminated sheet 1 obtained by laminating a film 2 mainly made of a thermoplastic resin and rubber 3 cured and adhered to the film mainly made of the thermoplastic resin is cut into a predetermined length and wound around a tire making drum, and then both end portions of the laminated sheet 1 are lap-spliced, and FIG. 5(b) showing the state after the laminated sheet 1 has been cure-molded in the state as shown in FIG. 5(a)

|  | Conventional Example 1 | Example 11 | Example 12 | Example 13 | Example 14 | Example 15 | Example 16 | Example 17 |
|---|---|---|---|---|---|---|---|---|
| Circumferential-direction overlap length L of lap-splice portion (mm) | 7 | 7 | 7 | 7 | 40 | 2 | 7 | 7 |
| Side cross-sectional shape of lap-splice portion | FIG. 5(b) | FIG. 3(a) | FIG. 4(b) | FIG. 4(c) | FIG. 3(a) | FIG. 3(a) | FIG. 3(a) | FIG. 3(a) |
| Thickness of film section 2A on cavity side in splice portion (at Tf (%)) | 100 | 60 | 60 | 100 | 60 | 60 | 10 | 90 |
| Thickness of film section 2B on tire outer circumference side in splice portion (at Tf ratio (%)) | 100 | 60 | 60 | 60 | 60 | 60 | 90 | 10 |
| Delamination resistance | 100 | 108 | 105 | 105 | 105 | 102 | 101 | 101 |
| Uniformity | 100 | 103 | 101 | 101 | 98 | 105 | 100 | 100 |

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A pneumatic tire comprising:
    a carcass layer; and
    an inner liner including a film mainly including a thermoplastic resin that is attached to an inside of the tire via a tie rubber sheet on an inner side of the carcass layer, the inner liner having a lap-splice portion where end portions of the film in a tire circumferential direction overlap each other in a tire widthwise direction with tie rubber therebetween, at least one of a section of the film on a tire cavity side and a section of the film on a tire outer circumference side in the lap-splice portion being formed in such a way that a film thickness in the lap-splice portion is smaller than a film thickness in a portion other than the lap-splice portion, a portion of the lap-splice portion which extends from a free distal end of the lap-splice portion and is formed to be thinner than a film thickness of the portion other than the lap-splice portion being formed to have such a shape that the film becomes thinner stepwise, and a film thickness of an entirety of the portion of the lap-splice portion where the film is thin being 20% to 80% of the thickness of the film in the portion other than the lap-splice portion.
2. The pneumatic tire according to claim 1, wherein an overlap length of the lap-splice portion in the circumferential direction is 3 to 30 mm.
3. The pneumatic tire according to claim 1, wherein the portion of the lap-splice portion which is formed to be thinner than a film thickness of the portion other than the lap-splice portion exists at least in a region between a belt end portion and a tip of a bead filler portion in a cross section along a tire meridian line.
4. The pneumatic tire according to claim 1, wherein the section of the film on the tire cavity side is formed in such a way that a film thickness in the lap-splice portion is smaller than a film thickness in a portion other than the lap-splice portion.
5. The pneumatic tire according to claim 1, wherein the section of the film on a tire outer circumference side in the lap-splice portion is formed in such a way that a film thickness in the lap-splice portion is smaller than a film thickness in a portion other than the lap-splice portion.
6. The pneumatic tire according to claim 1, wherein the section of the film on a tire cavity side and the section of the film on a tire outer circumference side in the lap-splice portion are formed in such a way that a film thickness in the lap-splice portion is smaller than a film thickness in a portion other than the lap-splice portion.

* * * * *